US012694457B2

(12) United States Patent
Florez et al.

(10) Patent No.: US 12,694,457 B2
(45) Date of Patent: Jul. 28, 2026

(54) SYSTEMS AND METHODS FOR SMART PRODUCTION OPERATIONS

(71) Applicant: Schlumberger Technology Corporation, Sugar Land, TX (US)

(72) Inventors: Fabian Florez, Gatwick (GB); Annalyn Azancot, Crawley (GB); Angelica Maria Vargas Gomez, Quito (EC); Wei Zhou, London (GB); Adriana Paola Rueda Sanabria, Bucaramanga (CO); Miguel Angel Hernandez de la Bastida, Sugar Land, TX (US); Krishna Reddy Arikatla, Pune (IN); Akshay Hemant Dhavale, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 17 days.

(21) Appl. No.: 18/830,849

(22) Filed: Sep. 11, 2024

(65) Prior Publication Data

US 2025/0086548 A1      Mar. 13, 2025

Related U.S. Application Data

(60) Provisional application No. 63/582,028, filed on Sep. 12, 2023.

(51) Int. Cl.
*G06Q 50/02* (2024.01)
*G06Q 10/0633* (2023.01)
(Continued)

(52) U.S. Cl.
CPC ......... *G06Q 50/02* (2013.01); *G06Q 10/0633* (2013.01); *G06Q 10/0637* (2013.01); *E21B 43/00* (2013.01); *E21B 2200/22* (2020.05)

(58) Field of Classification Search
CPC .............. G06Q 50/02; G06Q 10/0633; G06Q 10/0637; E21B 43/00; E21B 2200/22
See application file for complete search history.

(56) References Cited

U.S. PATENT DOCUMENTS 10,408,031 B2 * 9/2019 Oehring .................. E21B 41/00

FOREIGN PATENT DOCUMENTS

CN        111963116 B       4/2022
WO    WO-2017059152 A1 *   4/2017   ......... E21B 47/0224
(Continued)

OTHER PUBLICATIONS

Soares, Continuous Learning of Analytical and Machine Learning Rate of Penetration (ROP) Models for Real-Time Drilling Optimization PhD diss., The University of Texas at Austin (2018) (Year: 2018).*

(Continued)

*Primary Examiner* — Charles Guiliano
(74) *Attorney, Agent, or Firm* — Kyle R. Miiller

(57)            ABSTRACT
A method may include receiving a plurality of datasets from devices in a resource extraction site. The method may also involve identifying workflow systems associated with one or more operations of the devices. The method may also involve determining updated operational parameters for the devices based on the workflow systems and the plurality of datasets and generating one or more commands for implementing the one or more updated operational parameters for the one or more devices. The method may then include sending the commands to the devices, wherein the devices are configured to adjust the operations based on the updated operational parameters.

17 Claims, 4 Drawing Sheets

(51) Int. Cl.
 *G06Q 10/0637* (2023.01)
 *E21B 43/00* (2006.01)

(56) References Cited

FOREIGN PATENT DOCUMENTS

| WO | WO-2018117890 A1 * | 6/2018 | ............. E21B 43/26 |
| WO | 2021126613 A1 | 6/2021 | |

OTHER PUBLICATIONS

Search Report and Written Opinion of International Patent Application No. PCT/US2024/046095 dated on Dec. 17, 2024, 12 Pages.

\* cited by examiner

SYSTEMS AND METHODS FOR SMART PRODUCTION OPERATIONS

CROSS-REFERENCE TO RELATED APPLICATIONS

This application claims priority from and the benefit of U.S. Provisional Application No. 63/582,028, entitled "INTELLIGENT PRODUCTION OPERATIONS", filed Sep. 12, 2023, which is incorporated by reference herein in its entirety for all purposes.

BACKGROUND

The present disclosure relates generally to implementing autonomous production adjustments and operational control. More particularly, the present disclosure relates to an autonomous system for collecting information from production sites and adjusting production operations in view of the collected information.

As resources are extracted from various locations (e.g., via hydrocarbon wells in oil and/or gas fields, water), the extracted resources may be transported to various types of equipment, tanks, processing facilities, and the like via transport vehicles, a network of pipelines, and the like. For example, the resources may be extracted from reservoirs or other sources and may then be transported, via the network of transport equipment (e.g., pipelines), from the extraction locations to various processing stations that may perform various phases of processing to make the produced resources available for use or transport.

Digital technologies can be used to support and improve the production process related to extracting resources. For example, various digital technologies may be integrated within the resource extraction environment to support certain business objectives related to the operations of certain assets involved in the extraction process. For instance, the operations of the assets may be adjusted to improve production, reduce downtime, minimize carbon dioxide (CO2) emissions, optimize operational efficiencies, and the like. With the foregoing in mind, various types of digital technologies may assist extractors to autonomously modify operations of various assets to improve efficiencies of the extraction operation.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment a method may include receiving a plurality of datasets from one or more devices in a resource extraction site. The method may also involve identifying one or more workflow systems associated with one or more operations of the one or more devices. The method may also involve determining one or more updated operational parameters for the one or more devices based on the one or more workflow systems and the plurality of datasets; and generating one or more commands for implementing the one or more updated operational parameters for the one or more devices. The method may then include sending the one or more commands to the one or more devices, wherein the one or more devices are configured to adjust the one or more operations based on the one or more updated operational parameters.

Various refinements of the features noted above may be made in relation to various aspects of the present disclosure. Further features may also be incorporated in these various aspects as well. These refinements and additional features may be made individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION

Figure 1:
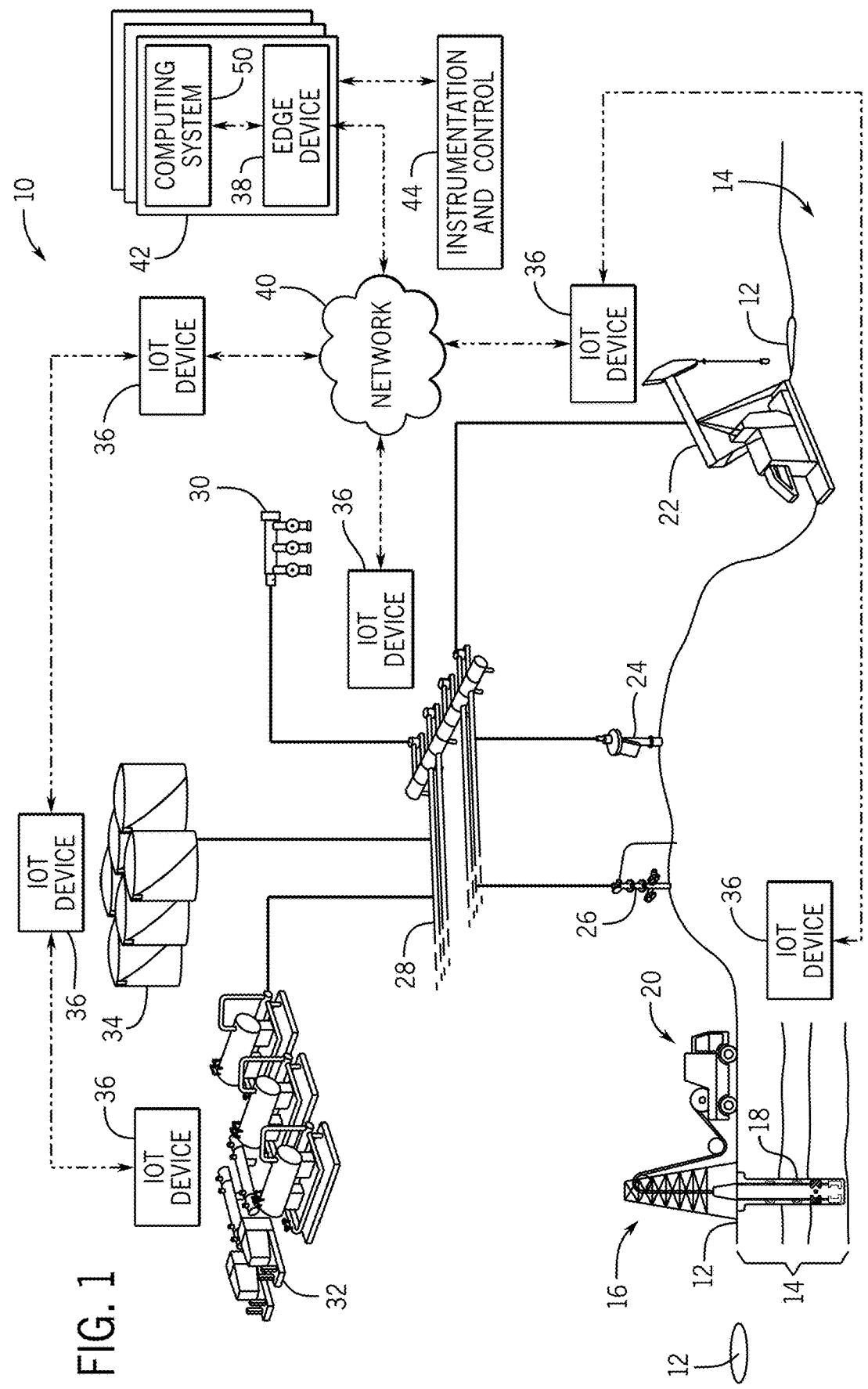
FIG. 1 illustrates a schematic diagram of an example hydrocarbon site that may produce and process hydrocarbons, according to one or more embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The drawing figures are not necessarily to scale. Certain features of the embodiments may be shown exaggerated in scale or in somewhat schematic form, and some details of conventional elements may not be shown in the interest of clarity and conciseness. Although one or more embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

When introducing elements of various embodiments of the present disclosure, the articles "a," "an," and "the" are intended to mean that there are one or more of the elements. The terms "including" and "having" are used in an open-ended fashion, and thus should be interpreted to mean "including, but not limited to . . . " Any use of any form of the terms "couple," or any other term describing an inter-action between elements is intended to mean either an indirect or a direct interaction between the elements described.

Certain terms are used throughout the description and claims to refer to particular features or components. As one skilled in the art will appreciate, different persons may refer to the same feature or component by different names. This document does not intend to distinguish between compo-nents or features that differ in name but not function, unless specifically stated.

Resource extraction sites may include a number of assets that facilitate the extraction, processing, and distribution of resources (e.g., oil, gas, water, minerals) extracted from a well, reservoir, site, source, or the like. As mentioned above, the integration of certain digital devices can support the strategic objectives of the resource extraction site, such as improving production, reducing downtimes, minimizing carbon dioxide ($CO_2$) emissions, optimizing operational efficiencies, and the like. With this in mind, the present embodiments described herein include employing a hybrid artificial intelligence (AI) system to perform Smart Produc-tion Operations (SPO), which may be enabled by integrating certain digital assets and solutions into automation and digitalization processes for controlling operations of assets within the resource extraction site. That is, the hybrid AI system may use instrumentation, wireless connectivity, advanced digital workflows, edge devices, Machine Learn-ing (ML) algorithms, Industrial Internet of Things (IIoT) solutions, and the like to improve resource extraction effi-ciencies and other operational tasks within the resource extraction site.

In some embodiments, the hybrid AI system may con-tinuously monitor the digital assets (e.g., measurements, set points) collected by instrumentation devices, control devices, Internet-of-Things (IOT) devices, edge devices, and the like. The hybrid AI system may include cloud-computing systems that may evaluate the collected data with respect to various machine learning models and/or various workflow systems designed to enhance or improve operations of the respective devices to maximize production of resources, minimize inefficiencies in resource extraction, and the like. In some embodiments, the hybrid AI system may deploy certain applications to the edge devices, IOT devices, con-trol devices, or the like to enable various assets or devices to be managed or controlled by the respective applications. In this way, control operations may be distributed closer to the assets being controlled via edge devices and the like.

The hybrid AI system may compare the collected datasets to machine learning models that may have been trained on datasets for similar assets, equipment, production opera-tions, and the like. In addition, the hybrid AI system may apply the collected datasets to certain workflow systems that represent artificial intelligence (AI) systems designed to autonomously determine operational parameters for similar assets, equipment, production operations, and the like. In this way, the hybrid AI system may automatically determine operational adjustments for various assets in a resource extraction site to improve efficiencies, production, and the like. By way of example, if the hybrid AI system determines that chemical injection equipment is present at a hydrocar-bon production site, the hybrid AI system may retrieve machine learning models or access workflow systems that characterizes the effects of operating the chemical injection equipment relative to the production metrics of various hydrocarbon production sites with respect to the various datasets associated with the assets that may be presenting the respective hydrocarbon production sites. In some embodi-ments, the hybrid AI system may deploy multiple applica-tions to various devices or assets (e.g., instrumentation and control devices) in the hydrocarbon production site to per-form various functions that may collectively be used to improve efficiency or production at the hydrocarbon pro-duction site. In this way, the production operations of the hydrocarbon production site may be continuously and autonomously managed to maximize production, minimize downtime, and the like.

By way of introduction, FIG. 1 illustrates a schematic diagram of an example hydrocarbon site 10 where hydro-carbon products, such as crude oil and natural gas, may be extracted from the ground, processed, and stored. Although the following description is related to the hydrocarbon site 10 and a hydrocarbon production system, it should be understood that FIG. 1 is provided as an exemplary embodi-ment to provide an example contextual environment to better appreciate the embodiments described herein. With this in mind, it should be noted that the embodiments described herein are not limited to hydrocarbon production systems. Instead, the present embodiments described herein may be implemented for any suitable resource extraction system, such as water extraction, mineral extraction, metal extraction, stone extraction, and the like.

Referring now to FIG. 1, in accordance with the present embodiments, the hydrocarbon site 10 may include a num-ber of components or facilities that correspond to wells, processing facilities, collection components, distribution networks, and the like. During the design phase of planning for the types of components to use at the hydrocarbon site 10, the locations of the components at the hydrocarbon site 10, and other design properties, a variety of factors are taken under consideration.

Indeed, hydrocarbon production systems are becoming more complex as the demands of affordable and sustainable energy sources grow. As such, the evolving growth in energy demand cultivates into an increased demand for economi-cally efficient field layout patterns. With this in mind, the present embodiments provide optimization techniques within the hydrocarbon site 10.

Referring now to FIG. 1, the hydrocarbon site 10 may include a number of wells 12 disposed within a geological formation 14. The wells 12 may include drilling platform 16 that may have performed a drilling operation to drill out a wellbore 18. The drilling operations may include drilling the wellbore 18, injecting drilling fluids into the wellbore 18, performing casing operations within the wellbore 18, and the like. In addition to including the drilling platform 16, the hydrocarbon site 10 may include surface equipment 20 that may carry out certain operations, such as cement installation operation, well logging operations to detect conditions of the wellbore 18, and the like. As such, the surface equipment 20 may include equipment that store cement slurries, drilling fluids, displacement fluids, spacer fluids, chemical wash fluids, and the like. The surface equipment 20 may include piping and other materials used to transport the various fluids described above into the wellbore 18. The surface equipment 20 may also include pumps and other equipment (e.g., batch mixers, centrifugal pumps, liquid additive metering systems, tanks, etc.) that may fill in the interior of a casing string with the fluids discussed above.

In addition to the equipment used for drilling operations, the hydrocarbon site may include a number of well devices that may control the flow of hydrocarbons being extracted from the wells 12. For instance, the well devices in the hydrocarbon site 10 may include pumpjacks 22, submersible pumps 24, well trees 26, and the like. The pumpjacks 22 may mechanically lift hydrocarbons (e.g., oil) out of the well 12 when a bottom hole pressure of the well 12 is not sufficient to extract the hydrocarbons to the surface. The submersible pump 24 may be an assembly that may be submerged in a hydrocarbon liquid that may be pumped. As such, the submersible pump 24 may include a hermetically sealed motor, such that liquids may not penetrate the seal into the motor. Further, the hermetically sealed motor may push hydrocarbons from underground areas or the reservoir to the surface. The well devices may include well trees that may be an assembly of valves, spools, and fittings used for natural flowing wells. As such, the well trees may be used for an oil well, gas well, water injection well, water disposal well, gas injection well, condensate well, and the like. By way of reference, the wells 12 may be part of a first hierarchical level and the well devices that extract hydrocarbons from the wells 12 may be part of a second hierarchical level above the first hierarchical level. Each hierarchical level may include a number of components or assets and the presently disclosed techniques may account for these levels when determining the design plans for the hydrocarbon site 10.

After the hydrocarbons are extracted from the surface via the well devices, the extracted hydrocarbons may be distributed to other devices via a network of pipelines 28. That is, the well devices of the hydrocarbon site 10 may be connected together via a network of pipelines 28. In addition to the well devices described above, the network of pipelines 28 may be connected to other collecting or gathering components, such as wellhead distribution manifolds 30, separators 32, storage tanks 34, and the like.

In some embodiments, the pumpjacks 22, the submersible pumps 24, well trees 26, wellhead distribution manifolds 30, separators 32, and storage tanks 34 may be connected together via the network of pipelines 28. The wellhead distribution manifolds 30 may collect the hydrocarbons that may have been extracted by the pumpjacks 22, the submersible pumps 24, and the well trees 26, such that the collected hydrocarbons may be routed to various hydrocarbon processing or storage areas in the hydrocarbon site 10. The separator 32 may include a pressure vessel that may separate well fluids produced from oil and gas wells into separate gas and liquid components. For example, the separator 32 may separate hydrocarbons extracted by the pumpjacks 22, the submersible pumps 24, or the well trees into oil components, gas components, and water components. After the hydrocarbons have been separated, each separated component may be stored in a particular storage tank 34. The hydrocarbons stored in the storage tanks 34 may be transported via the pipelines 28 to transport vehicles, refineries, and the like.

In some embodiments, the various assets or components described above may be communicatively coupled to an Internet-of-Things (IOT) device 36. The IOT devices 36 may be distributed throughout the hydrocarbon site 10 and may collect information, perform analysis on data, send data related to a respective component or parameters (e.g., temperature, flow) of a component to a computing system or the like. In some embodiments, instrumentation and control devices 44 may include sensors, actuators, machines, or other equipment that may include a processor that execute computer instructions and performs certain tasks including collecting data, processing data, and communicating data over a network. In addition, the IOT device 36 may be used to enable the instrumentation and control devices 44 to access the network 40 or other devices to control operations of the respective equipment. The IOT device 36 may also track the flow of the hydrocarbons, positions of valves for directing the hydrocarbons within the pipelines, locations of the vehicles used to transport the hydrocarbons, and the like.

The IOT device 36 and/or the instrumentation and control devices 44 may be communicatively coupled to an edge device 38, which may be a hardware device that processes or receives data at the edge of a network close to the source of the data. As such, the edge device 38 may include gateway device that collect data from various sensors, the IOT devices 36, and the like. The edge device 38 may also include embedded systems that integrate into other devices, industrial controllers that control equipment in the hydrocarbon site 10, routers, network switches, and the like. By way of operation, the edge device 38 may process and analyze datasets received from IOT devices 36 and the like with reduced latency in view of its proximity to the data sources to provide real-time solutions and commands. Moreover, the edge device 38 may help manage the available bandwidth used within a network, provide improved security for accessing devices in the hydrocarbon site 10, and the like. Although only one edge device 38 is depicted in FIG. 1, it should be understood that additional edge devices 38 may be positioned around the hydrocarbon site 10.

The edge device 38, the IOT device 36, the instrumentation and control devices 44 may be communicatively coupled to each other via a network 40. The network 40 may include any suitable communication interface that controls data exchange between devices and systems. As such, the network 40 may include local area networks (LANs) such as Ethernet, Wireless LAN (WLAN) such as Wi-Fi networks, Industrial Ethernet networks such as PROFINET, EtherNet/IP, LoRaWAN, Modbus TCP, Industrial Wireless Networks, and other types of networks employing various communication protocols.

In some embodiments, the edge device 38 may make up part of a hybrid artificial intelligence (AI) system 42. The hybrid AI system 42 may include one or more edge devices 38 and one or more computing systems 50. The hybrid AI system 42 may receive data from the IOT devices 36, the edge device 38, the instrumentation and control devices 44, and the like directly from the respective devices or via the network 40. The hybrid AI system 42 may process data regarding various aspects of the hydrocarbon site 10 to better analyze the production operations and provide commands to enhance the operations.

With this in mind, in one embodiment, the hybrid AI system 42 may assess a digital maturity of the hydrocarbon site 10 to evaluate a level of digitalization associated with the monitor and control of equipment within the hydrocarbon site 10. The hybrid AI system 42 may use machine learning models generated based on other hydrocarbon sites and information regarding the equipment present in the hydrocarbon site 10 to determine locations for additional digital solutions or equipment (e.g., IOT devices 36) to improve operational efficiency and production optimization of the hydrocarbon site 10. In addition, the hybrid AI system 42 may employ workflow systems that may implement AI systems or components that determine production parameters, device settings, workflow processes, and the like to adjust operations at the hydrocarbon site 10 or any suitable resource extraction site. Indeed, the hybrid AI system 42 may identify devices or equipment that could be deployed to the hydrocarbon site 10, identify other devices that are present at the hydrocarbon site 10 that may not currently being used, determine settings for those devices, issue commands to the devices, and the like.

After the locations for the digital solutions are selected using various parameters such as achieving a Mean Time Between Failure (MTBF) below a threshold, reducing production losses, and the like, the hybrid AI system 42 may define instrumentation and digital applications that may be used to successfully reach the Key Performance Objectives (KPO's) for the operations. By way of example, the hybrid AI system 42 may propose adding digital sensors and equipment at various locations such as wireless pressure and temperature transmitters, wireless electrical corrosion probes, single and multiphase flow meter, Remote Terminal Units (RTUs), Dump Flooding (DF) and oil producers well surveillance, satellite communication links, applications for performing digital autonomous operations for chemical injection, edge devices 38 that include operational workflows and autonomous control functions, applications that perform Virtual Flow Meter (VFM) operations, cameras with visual analytics algorithms for security, components for safety monitoring alerts and flares volume estimation, and the like.

By collecting data from the various digital assets, the hybrid AI system 42 may analyze the respective datasets, process the datasets in one or more machine learning models or workflow systems for determining production efficiencies with respect to operations of equipment in the hydrocarbon site 10, and generate commands to send to equipment to enhance production, reduce downtimes, optimize artificial lift reliability, extend run life of equipment, and the like. In addition, the hybrid AI system 42 may perform well screening operations using the received datasets to perform root cause analysis for production performance issues. In the same way, the hybrid AI system 42 may ensure effective, continuous, and autonomous chemical injection that may reduce $CO_2$ emissions per month, improve people efficiency, improve security surveillance of the location. optimize the operational efficiency through digital autonomous tasks, and the like.

As will be described herein, the hybrid AI system 42 may execute and orchestrate the generation of innovative automated workflows for a digital transformation strategy in the oil and gas industry, improving the digital maturity of a field, increasing autonomous production operations to optimize production, resources, reduce the environmental impact, minimize operational costs and security concerns, and the like. That is, the hybrid AI system 42 may orchestrate the execution of different workflow systems that may implement different AI components or processes to determine updated operations. In addition, since the hybrid AI system 42 may be communicatively coupled to the IOT devices 36, the instrumentation and control devices 44, and other equipment via the network 40, the present embodiments described herein may thus allow improved operations to be achieved in a challenging and/or remote location where manual processes are difficult to perform and/or a strict surveillance workflow is needed. In addition, the hybrid AI system 42 may also be applied in locations that may be accessible but without many resources available or at locations where the dynamic changes in the production system cannot be realized by humans/manual workflows.

Indeed, some examples of challenges for implementing remote monitoring and control operations include accessing these remote locations, resulting in increased lengths of times to detect and solve production issues. Other challenges include operating in view of electrical power shutdowns or unreliable electrical power, various flow assurance events that may involve performing some chemical demand operation to treat emulsion, corrosion, and asphaltenes. In addition, the lack of well test data or the lack of up-to-date/real-time well test data may impact production reporting and production allocation efficiency. In the same manner, the lack of measurements at the surface or various other locations within the hydrocarbon site 10 may result in, for example, a lack of operational monitoring and alarms for pressure, temperature, and other parameters. Indeed, to improve the oil production optimization, the hybrid AI system 42 may generate virtual flow estimations with available datasets that the hybrid AI system 42 may then use to update operations in spite of the lack of well test data, which may indicate the current flow rates of oil, gas, and water within the production, the pressure data related to the production, temperature data, fluid properties, and the like. In this way, the hybrid AI system 42 may analyze the virtual data to determine possible optimizations or debottlenecking processes that may be implemented at various devices to avoid production losses in the wells.

In addition, the hybrid AI system 42 may also coordinate or control secondary recovery strategies, such as water injection, to provide pressure support, employing artificial lift systems, installing electrical submersible pumps, and the like to increase production. The digital transformation at the field (e.g., hydrocarbon site 10) may also enable the hybrid AI system 42 to integrate digital solutions that support the business strategic objectives of assets or equipment to improve production, reduce downtimes, minimize $CO_2$ emissions, and optimize operational efficiencies. For instance, the secondary recovery project implemented by the hybrid AI system 42 may include the real-time monitoring and surveillance of water injection and oil production, intervention rate reduction, early detection of events, use and operation of the systems efficiently, and the like. Indeed, the hybrid AI system 42 may control equipment to prevent the uncontrolled water channeling in the pattern by analyzing received datasets to perform a real time detection of possible events in the water injection performance at the reservoir. In this way, in spite of the limited process surveillance, the lack of data integration, missing manual operations, the inaccurate measurements of water flood flow regulator valves, metering systems, power generator fluctuations, and other issues, the hybrid AI system 42 may autonomously control the operations of the assets or equipment via the IOT devices 36 to maintain or improve productions for the life of the hydrocarbon site 10.

Although the hydrocarbon site 10 is described above with certain components, it should be understood that the hydrocarbon site 10 may include additional or fewer components. That is, the embodiments described herein are directed to improving production operations at the hydrocarbon site 10 that may include various types of components that are related to the production and distribution of hydrocarbons. In this way, the components depicted in FIG. 1 are provided as an example context in which the embodiments described herein may be implemented. As such, the embodiments of the present disclosure should not be limited to the components listed in FIG. 1. Indeed, the present embodiments described herein may be implemented in any suitable resource extraction system.

Keeping this in mind, the present embodiments described herein may include systems and methods for autonomously adjusting operations of various assets in the hydrocarbon site 10 based on data related to the hydrocarbon site 10. By way of operation, the hybrid AI system 42, as presented in FIG. 2, may receive the input data and determine operational adjustments for the components in the hydrocarbon site 10 based on various machine learning algorithms, workflow systems 46, external hybrid AI systems 48, databases 49, other cloud systems/services, other software platforms (e.g., Plant Design Management System (PDMS)) and the like according to processes that will be described in greater detail below.

Figure 2:
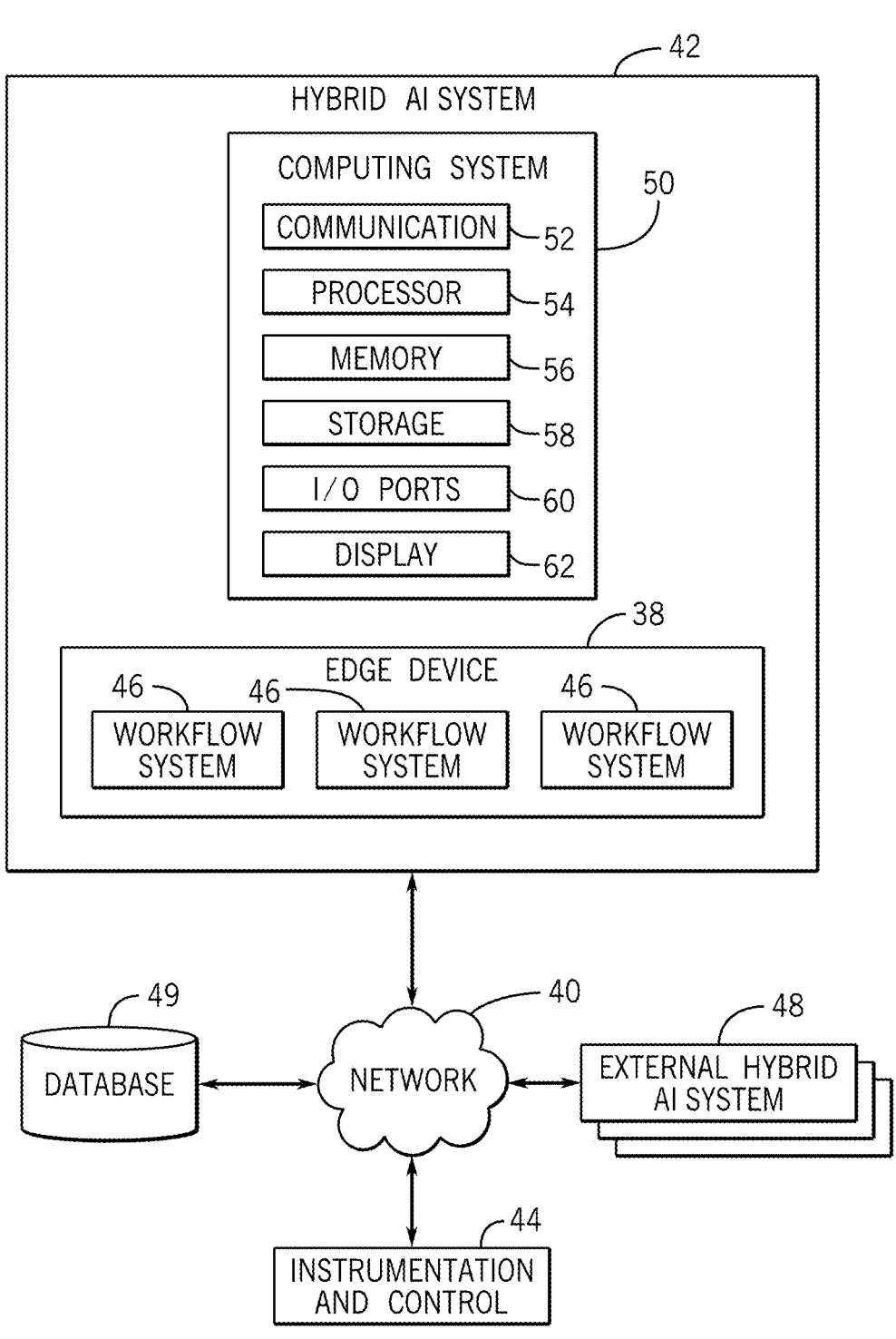
FIG. 2 illustrates a block diagram of various components that may be part of a hybrid artificial intelligence (AI) system for determining operational adjustments for assets that may be part of the hydrocarbon site of FIG. 1, according to one or more embodiments of the present disclosure.

Referring now to FIG. 2, the hybrid AI system 42 may include a computing system 50 that may be any suitable computing device, cloud-computing device, or the like and may include various components to perform various analysis operations. As shown in FIG. 2, the computing system 50 may include a communication component 52, a processor 54, a memory 56, a storage component 58, input/output (I/O) ports 60, a display 62, and the like. The communication component 52 may be a wireless or wired communication component that may facilitate communication between different monitoring systems, gateway communication devices, various control systems, and the like. The processor 54 may be any type of computer processor or microprocessor capable of executing computer-executable code. The memory 56 and the storage component 58 may be any suitable articles of manufacture that can serve as media to store processor-executable code, data, or the like. These articles of manufacture may represent computer-readable media (i.e., any suitable form of memory or storage) that may store the processor-executable code used by the processor 54 to perform the presently disclosed techniques. The memory 56 and the storage component 58 may also be used to store data received via the I/O ports 60, data analyzed by the processor 54, or the like.

The I/O ports 60 may be interfaces that may couple to various types of I/O modules such as sensors, programmable logic controllers (PLC), and other types of equipment. For example, the I/O ports 60 may serve as an interface to pressure sensors, flow sensors, temperature sensors, and the like. As such, the computing system 50 may receive data associated with a well via the I/O ports 60. The I/O ports 60 may also serve as an interface to enable the computing system 50 to connect and communicate with surface instrumentation, servers, and the like.

The display 62 may include any type of electronic display such as a liquid crystal display, a light-emitting-diode display, and the like. As such, data acquired via the I/O ports and/or data analyzed by the processor 54 may be presented on the display 62, such that the computing system 50 may present designs for hydrocarbon sites 10 for view. In certain embodiments, the display 62 may be a touch screen display or any other type of display capable of receiving inputs from an operator. Although the computing system 50 is described as including the components presented in FIG. 2, the computing system 50 should not be limited to including the components listed in FIG. 2. Indeed, the computing system 50 may include additional or fewer components than described above.

With the foregoing in mind, the computing system 50 may operate independently or in conjunction with one or more edge devices 38 that may make up the hybrid AI system 42. In some embodiments, the edge device 38 may include one or more workflow systems 46 that may perform analytical operations to generate workflows, commands (e.g., actuate), operational settings, adjustments, and the like for different equipment that may be part of the instrumentation and control devices 44. The workflow systems 46 may leverage physical based models for operations of certain processes, functions, devices, and the like with machine learning models to determine recommended operational settings, device adjustments, and the like. The workflow systems 46 may thus be hosted by the edge devices 38, the computing system 50, other cloud systems, external hybrid AI systems 48, and the like.

In addition, the hybrid AI system 42 may, by way of the computing system 50, coordinate with external hybrid AI systems 48 that may be suited to resolve or analyze particular datasets or determine other workflows that may be orchestrated and executed. The external hybrid AI systems 48 may mirror the hybrid AI system 42 described herein or may also be other suitable types of cloud-computing systems, servers, service platforms, and the like. Indeed, the hybrid AI system 42 may orchestrate and execute workflows generated using the workflow systems 46, various AI/ML/cloud service platforms, and the like. For example, the hybrid AI system 42 may coordinate with a visualization and control platform system that may be a service provided by a cloud-computing system or server. In this example, the hybrid AI system 42 may retrieve and route relevant datasets from a storage location (e.g. database 49) to the visualization and control platform to generate visualizations representative of production outputs or parameters associated with the hydrocarbon site 10.

The database 49 may include any suitable storage component that may serve as a data repository to store collected data. In this way, the hybrid AI system 42 may orchestrate the distribution of certain datasets to certain workflow systems 46, external hybrid AI systems 48, or the like to execute certain analysis and issue generated commands to the instrumentation and control devices 44.

Figure 3:
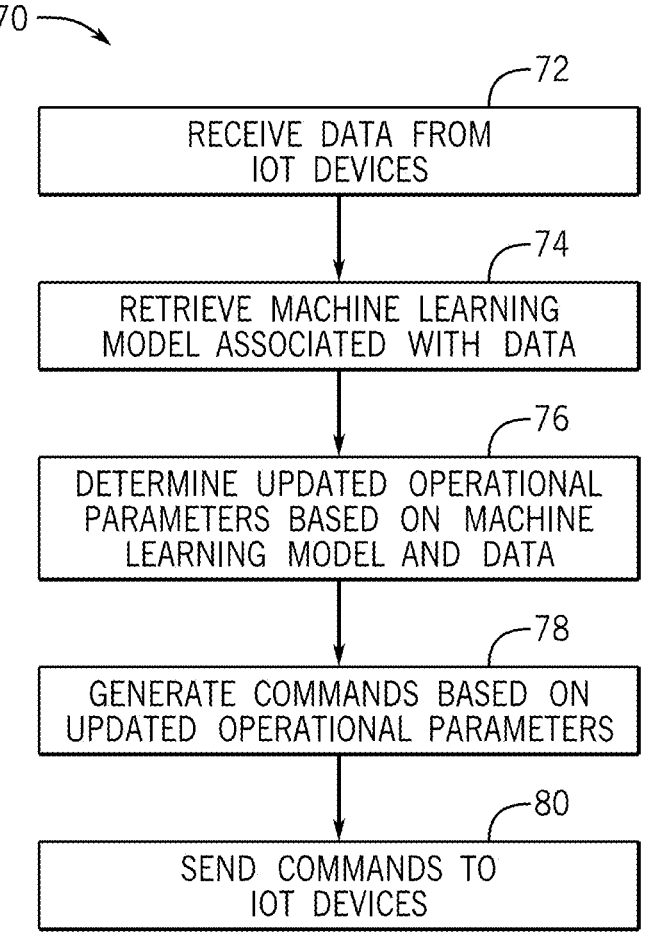
FIG. 3 is a flow diagram of a method for autonomously controlling various assets of the hydrocarbon site of FIG. 1, according to one or more embodiments of the present disclosure.

With the foregoing in mind, FIG. 3 illustrates a method 70 for autonomously orchestrating one or more workflow systems to control various assets and equipment (e.g., instrumentation and control devices 44) that may be part of the hydrocarbon site 10, in accordance with embodiments described herein. Although the following description of the method 70 is described as being performed by the hybrid AI system 42 and in a particular order, it should be noted that the method 70 may be performed in any suitable order and by any suitable computing system.

Referring now to FIG. 3, at block 72, the hybrid AI system 42 may receive data from the IOT devices 36, the instrumentation and control devices 44, or other component/asset/equipment in the hydrocarbon site 10. The data may be related to sensor data (e.g., pressure, temperature, speed, frequency), operational data (e.g., speed, active/inactive status), position data (e.g., position of valve), and the like.

The collected data may thus include any suitable digital data acquired, measured, simulated, or generated by a component within the hydrocarbon site 10.

By acquiring data via the network 40 and other components, the hybrid AI system 42 may equip production operators to monitor production from remote locations to allow real-time detection of events (e.g., alarms) and resolution of production issues within an efficient amount of time in view of the real-time detection and real-time production operation adjustment. For example, different production operations, such as water injection (e.g., via one or more water injector or one or more water disposal wells) and chemical injection, may be implemented based on the real-time monitoring data acquired by the hybrid AI system 42.

At block 74, the hybrid AI system 42 may retrieve or identify a machine learning model associated with the collected data, a workflow system 46 associated with the desired output parameter (e.g., production rate, efficiency), and the like. That is, the collected data may be related to a particular hydrocarbon site 10 with specific types of equipment, certain types of formations, within certain types of geological features, and the like.

Based on the information or context provided by the collected data, the hybrid AI system 42 may query the database 49 or other storage component to identify a machine learning model that is associated with the information or context. In some embodiments, the machine learning models may be trained in a supervised or unsupervised manner to recognize relationships and patterns between input data (e.g., IOT data) and operational characteristics (e.g., flow rate, production, CO2 emissions) of a hydrocarbon production system. As such, the machine learning models may provide expected production behavior or data for various input data or scenarios.

For instance, the machine learning models may be trained based on measured data from IOT devices 36 and corresponding production data (e.g., flow rate, production rate) related to production operations over a period of time. The machine learning models may also track various types of equipment, boreholes, well trajectories, reservoirs, subsurface properties, weather data, and the like with respect to various hydrocarbon production parameters, alarms, issues, and the like. The machine learning models may track operational settings and parameters of equipment in the hydrocarbon site 10 with respect to the collected datasets over the period of time to identify operational settings that improve production.

In some embodiments, the hybrid AI system 42 may not identify a machine learning model that matches the exact properties depicted from the data received at block 72. However, in this case, the hybrid AI system 42 may identify machine learning models for portions of the collected data and identify suitable machine learning models to assist the hybrid AI system 42 in determining updated operational parameters based on the respective portions of collected data. That is, the machine learning model may characterize production flow rates relative to pressure data, as opposed to every aspect of the hydrocarbon site 10 provided in the data received at block 72.

As will be described below, the machine learning models may be related to a number of different applications, such as employing a chemical injection system, performing water-flooding operations, modifying artificial lift system operations, performing alarm and monitoring services, and the like. Indeed, the machine learning models may be trained with datasets related to the operations of the respective systems to identify operational settings (e.g., flow rate) that improve production. In some embodiments, the machine learning models may be employed by the workflow systems to generate AI solutions or recommendations for desired output parameters. As such, the workflow systems 46 may perform various AI analysis operations to generate recommended operations for the instrumentation and control devices 44. The workflow systems 46 may employ certain machine learning algorithms, AI analysis techniques, or the like. In some cases, each workflow system 46 may be designed to determine a particular output parameter (e.g., desired pressure) with respect to a particular set of input data. In this way, the hybrid AI system 42 may orchestrate and execute the implementation or engagement of any workflow system 46 based on the available datasets and the desired output parameters, which may be specified by a user. As a result, the hybrid AI system 42 may coordinate the orchestration of individual workflow systems, including coordinating the data flow between workflow systems 46, to determine instructions or commands to issue to the instrumentation and control devices 44.

At block 76, the hybrid AI system 42 may determine updated operational parameters for the equipment in the hydrocarbon site 10 based on the retrieved machine learning model, outputs from the workflow systems, and the like. That is, the hybrid AI system 42 may determine desired production parameters (e.g., flow rate, pressure), detect production inefficiencies, or other issues that may cause the hydrocarbon site 10 to produce less hydrocarbon than possible according to the respective machine learning model.

At block 78, the hybrid AI system 42 may generate commands to send to IOT devices 36, the instrumentation and control devices 44, or other equipment based on the updated operational parameters. That is, the hybrid AI system 42 may determine commands to cause the hydrocarbon system 10 or the equipment therein to achieve the updated operational parameters. As such, in some embodiments, the hybrid AI system 42 may determine set points or adjustments for equipment that may be controlled by the IOT devices 36 or other suitable control system.

At block 80, the hybrid AI system 42 may send the generated commands to the IOT devices 36, equipment, or the like. The hybrid AI system 42 may send the commands directly to the IOT devices 36, the instrumentation and control devices 44, and the like via the network 40 or via any suitable communication scheme. In turn, after the respective device receives the command, the device may adjust the operations of the respective device. The method 70 may be performed continuously to cause the hydrocarbon system 10 to continuously update its operational parameters, thereby enabling the hybrid AI system 42 to autonomously control the equipment.

By way of example, the hybrid AI system 42 may receive data from the IOT devices 36, the instrumentation and control devices 44, and the like and retrieve machine learning models and/or the workflow systems 46 to assist the hybrid AI system 42 to meet injection targets, reduce oil production losses, detect system bottlenecks, support CO2 emissions reductions, and the like. That is, the retrieved machine learning models or outputs from the workflow systems 46 may provide optimization techniques or plans to modify operations of the IOT devices 36, the instrumentation and control devices 44, or other equipment to improve efficiencies of wells, facilities, and components in the hydrocarbon site 10 in a collaborative digital cloud solution that leverages cloud intelligence or the hybrid AI system 42 for real time monitoring, ESP analysis, surface, and downhole measurements, well test, smart alarms, advanced workflows, and autonomous chemical injection which aim to maximize oil production and achieve the objectives of a waterflooding strategy.

Figure 4:
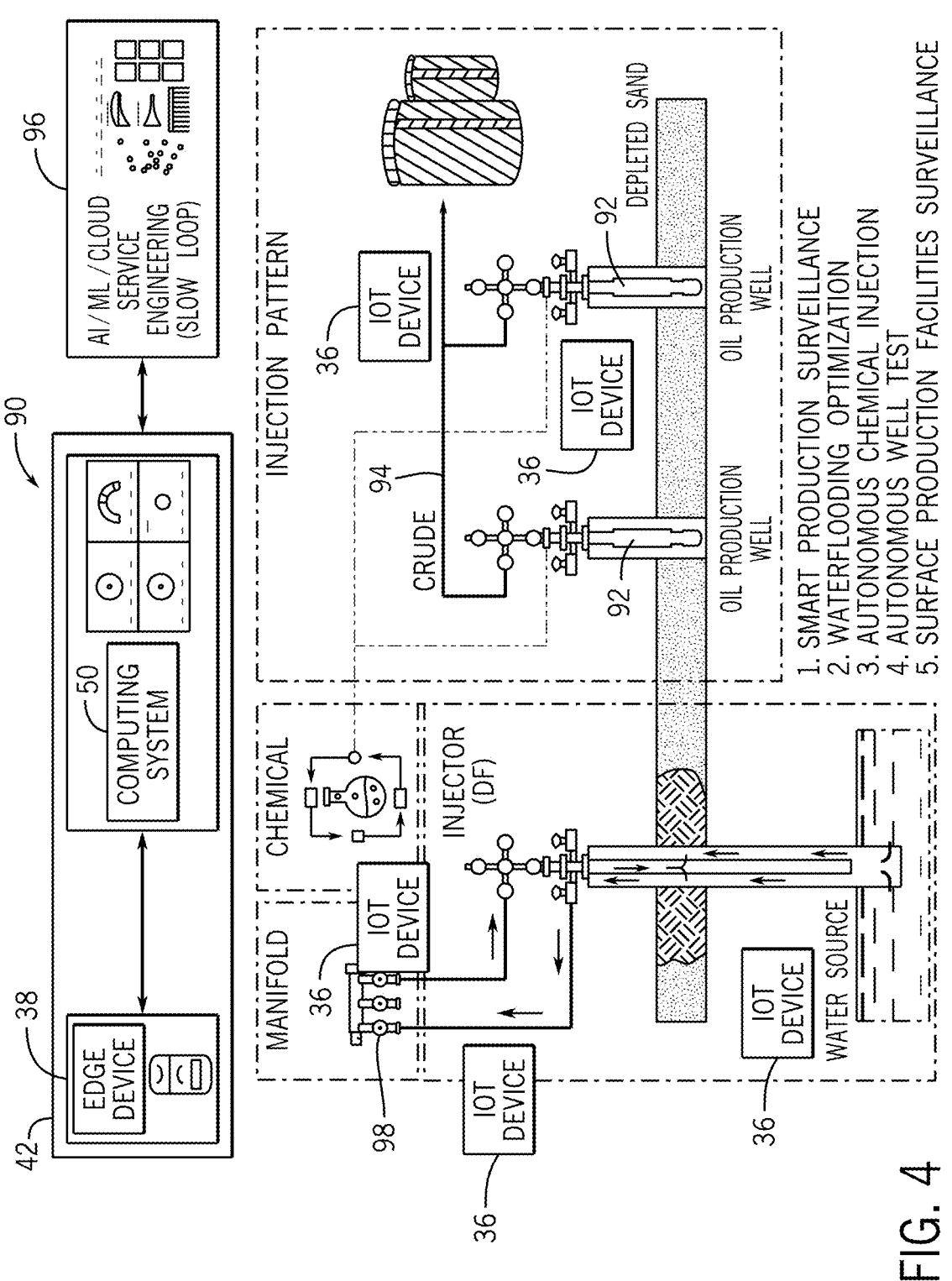
FIG. 4 is an example production system cluster wells that includes a chemical injection system that may be part of the hydrocarbon site of FIG. 1, according to one or more embodiments of the present disclosure.

With this in mind, FIG. 4 illustrates an example production system cluster wells 90 that may be monitored and controlled by the hybrid AI system 42. The production system cluster wells 90 may include oil production wells 92 that may be coupled to pipelines 94. The surface assembly associated with the oil production well 92 may include a water injection system for a dump flooding well, a chemical injection system, an injection manifold, and the like.

In some embodiments, based on the machine learning models and/or workflow systems 46 associated with similar types of oil production wells 92, the hybrid AI system 42 may determine water and/or chemical injection rates for enhancing production of the oil production wells 92. That is, the hybrid AI system 42 may employ the method 70 to manage operations of the production system cluster wells 90. Indeed, traditional mechanical pumps may not autonomously manage a continuity of an injection rate of chemical due to limited connectivity of IOT devices 36 and/or the instrumentation and control devices 44 access to machine learning models, and the like. As a result, various tools (e.g., ESPs) disposed in wells may suffer from scale deposits and corrosion that eventually lead to failures, production shutdowns, remedial activity costs, and the like. Moreover, the manual acquisition and analysis of data involved for optimizing chemical injection rates may result in delays of up to 90 days, thereby making the chemical treatment ineffective due to the dynamic nature of well conditions.

With this in mind and referring to FIG. 4, the IOT devices 36 and/or the instrumentation and control devices 44 may provide information related to the production rate or flow of production via pipelines 94. In some embodiments, the information may include data related to the properties of the produced hydrocarbons. The hybrid AI system 42 may collect the data from the IOT devices 36 and/or the instrumentation and control devices 44 to perform the method 70 described above. That is, in some embodiments, the hybrid AI system 42 may determine commands to send to the IOT devices 36 and/or the instrumentation and control devices 44 based on machine learning models, workflow systems 46, the collected data, and the like. By way of example, the machine learning models and/or workflow systems 46 may be related to performing chemical injections based on data related to the hydrocarbon site 10, the production rate, the flow within the pipelines 94, and the like. In some embodiments, the hybrid AI system 42 may engage with or provide the collected data to a cloud service 96, which may be a cloud computing system (e.g. workflow system 46) that may efficiently process the data and apply the machine learning models described above to the datasets to determine commands for the IOT devices 36 and/or the instrumentation and control devices 44 that may improve production.

The cloud service 96 (e.g., workflow system 46) may manage the storage and application of the machine learning models to maximize the efficiency in which the datasets are analyzed. That is, the cloud service 96 may employ cloud computing systems to enable parallel processing to expedite the analysis performed using the machine learning models. As a result, the cloud service 96 may generate commands for IOT devices 36 and/or the instrumentation and control devices 44 to improve production rates and the like. It should be noted that the cloud service 96 may include any suitable cloud-computing system, a computing system that is on the premises, or the like. Moreover, it should be noted that the hybrid AI system 42 may orchestrate and execute the cloud service 96 (e.g., workflow system 46) to perform the operations described herein.

In some embodiments, the commands may be related to a chemical injection rate provided to the oil production wells 92. Indeed, certain chemicals, such as surfactants, polymers, acids, corrosion inhibitors, scale inhibitors, biocides, gelling agents, crosslinkers, breakers, foamers, water control agents, and the like, may be injected into the oil production wells 92 to improve production, extend the life of the equipment, and the like. As such, certain instrumentation and control devices 44 may include valves and actuators that control the amount of chemicals provided to the production wells 92 via a manifold 98 or the like. The cloud service 96, the hybrid AI system 42, the edge device 38, or other suitable communication component may route the generated commands to the instrumentation and control devices 44 to control the flow of chemicals to enhance the production.

In the same manner, the commands may be related to a water injection rate provided to the oil production wells 92 via the manifold 98 or the like. The water injection rate or waterflooding operations may improve production by maintaining certain pressure, displacing oil in the reservoir, reducing oil viscosity, and the like. As such, the embodiments presented herein may implement waterflooding optimization workflows (e.g., generated via workflow systems 46) that may be used to monitor and evaluate the water injection systems from the water source to an injector sand face to reduce production losses associated to inadequate or inefficient injection rates.

In some embodiments, a water source well may be equipped with an ESP. In one example, this pump may achieve a daily water production of 3,600 BWPD, while its nominal maximum capacity is 4,000 BWPD. The hybrid AI system 42 or other suitable device may regulate water injection flow rates using the ESP pump frequency or by adjusting the choke valve located on the wellheads of each injector well. With the digitization implementation achieved by the hybrid AI system 42, the secondary recovery process (e.g., waterflooding) may be monitored in real time through the variables: estimated VFM, manifold pressure, and well head pressure. With these three variables, the hybrid AI system 42 may identify early deviations, which may allow the hybrid AI system 42 to take immediate actions to maintain the optimal volumetric balance on the injection pattern.

In addition, the hybrid AI system 42 may integrate and visualize the relevant datasets in a Waterflooding Surveillance Dashboard Visualization (e.g., via the workflow system 46) or the like. The hybrid AI system 42 may implement an advanced workflow and detect operational alarms for the waterflooding system and may also allow for autonomous adjustments with regards to the water flow rate changing frequency in VSD equipment, thereby implementing a water injection system with automatic control.

In some embodiments, the hybrid AI system 42 may perform autonomous monitoring operations and determine self-optimization recommendations based on monitoring and evaluation of ESP Performance, the chemical efficiency, and scale and corrosion prediction models to ensure proper chemical dose to improve the chemical efficiency, thereby reducing production losses associated to chemical treatment efficiency. Also, the operational parameters of an ESP, like frequency, amperage, pressures, Pump Intake Pressure (PIP), and temperature per well, may be monitored in real time via the hybrid AI system 42, the IOT devices 36, the instrumentation and control devices 44, and the like. The operational parameters may also be monitored with respect to their protection settings (values and configurations), such that the hybrid AI system 42 may detect deviations from injection and pressure objectives and annunciate the operational alarms with notifications at the edge device 38 or other suitable component. The hybrid AI system 42 may thus implement an autonomous workflow with the calculated flowrate at surface to perform deviation detection and protection monitoring. Using the determinations, the hybrid AI system 42 may automatically start regulating the frequency to compensate for the change in flowrates and pressure in a safe manner to compensate for any deviation in the surface flowrate and pressure objective. By way of example, the hybrid AI system 42 may detect and correct for operational alarms such as oil rates, water rates, target liquid rates, injection pressure limit, injection rate target, injection rate cross check, and the like.

In addition to the embodiments described above, the hybrid AI system 42 may perform artificial lift surveillance and diagnostic operations. Indeed, the hybrid AI system 42 may implement the method 70 described above to perform artificial lift surveillance and diagnostics that may combine smart monitoring and alarming features to ensure uninterrupted operation of the artificial lift, thereby minimizing production losses. For instance, by performing virtual flow meter (VFM) calculations (e.g., via machine learning models) and setting alarms accordingly, the hybrid AI system 42 may swiftly identify opportunities for production optimization and promptly address any deviation. Moreover, smart monitoring and alarming have the purpose to ensure continuity of the artificial lift operation, preventing shutdowns and downtimes, and perform a faster identification of production optimization opportunities. In this way, the artificial lift surveillance and diagnostics may prevent downtime because surveillance and diagnostics enable real time monitoring of ESP parameters, thereby detecting deviations and issues early, and preventing unexpected downtime. Further, the hybrid AI system 42 may maximize efficiency by continuously monitoring ESP parameters to allow operators to identify inefficiencies and optimize system performance. In this way, the hybrid AI system 42 may automatically make adjustments based on variables such as frequency, amperage, pressures, and temperatures, enhancing efficiency and maximizing production output.

Additionally, the hybrid AI system 42 may perform early detection of failures using surveillance and diagnostics to help identify potential failures or performance degradation in advance. By monitoring key indicators and analyzing trends, the hybrid AI system 42 can take proactive measures such as maintenance or repairs, avoiding catastrophic failures and production disruptions.

The hybrid AI system 42 may also provide improved protection and safety. That is, since ESPs operate in demanding conditions, monitoring protection settings may help ensure that the ESP operates within safe limits. Alarms and notifications are triggered for abnormal conditions, allowing prompt action to mitigate risks.

The hybrid AI system 42 may also improve optimization of artificial lift systems by analyzing data and identifying optimization opportunities to improve performance of the entire lift system. Indeed, the hybrid AI system 42 may fine-tune the hydrocarbon site 10 operations to improves overall efficiency, production rates, equipment longevity, and the like. In this way, the hybrid AI system 42 may ensure efficient operation and early issue detection to contribute to cost savings. By minimizing downtime, reducing equipment failures, optimizing energy usage, and improving overall production efficiency, the production operations achieve significant cost savings and maximize ESP investment.

Technical effects for the embodiments described herein include autonomously updating production operations at the hydrocarbon site 10 by remotely monitoring and controlling operations via the hybrid AI system 42 and other intervening components. That is, instead of performing data gathering operations, collecting well production data, performing chemical analysis, and implementing actions for improvements manually that may involve delayed event/alarm detection and/or delayed preventive/corrective actions, the present embodiments described herein include an integrated and collaborative digital application in which these processes may be performed digitally in real time, remotely and autonomously. As such, the present embodiments described herein provide a positive impact in the remote field operations generating benefits to the asset in a challenging location through the implementation of a digital collaborative application that will enable autonomous chemical injection surveillance, ESP monitoring and autonomous operation, waterflooding optimization, flare monitoring, and the like using IOT devices, edge and computing solutions, machine learning algorithms, and cloud collaborative environment applications to transform the manual operation into a digital operation culture in the O&G industry. These solutions may then allow for smart monitoring and self-optimization and recommendations to ensure proper wells chemical doses, identifying chemical pumps status and chemical tank levels, reducing production losses associated to chemical treatment efficiency, and the like. Further, the embodiments presented herein allow for analytics and insights to produce automated recommendations to enhance oil production and waterflooding optimization, thereby improving the digital maturity of a field and improving the profit of the asset.

Reference throughout this specification to "one embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment. Although the present disclosure has been described with respect to specific details, it is not intended that such details should be regarded as limitations on the scope of the present disclosure, except to the extent that they are included in the accompanying claims.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:

receiving a plurality of datasets from one or more devices in a resource extraction site, the plurality of datasets including sensor data and/or operational data from the one or more devices, and the one or more devices including a valve, manifold, and/or pump of chemical injection equipment, water flooding equipment, artificial lift equipment, liquid metering equipment, power generation equipment, or a combination thereof;

selecting a respective machine learning model for each context identified in the plurality of datasets, wherein each dataset is associated with respective equipment of the resource extraction site;

determining an additional device to deploy at a recommended location in the resource extraction site and one or more operational parameters for the additional device using the respective machine learning model and the plurality of datasets, the additional device including at least one selected from a group consisting of a valve, a manifold, and a pump of chemical injection equipment, water flooding equipment, artificial lift equipment, liquid metering equipment, power generation equipment, or a combination thereof;

deploying the additional device to the recommended location at the resource extraction site:

generating one or more commands for implementing the one or more operational parameters for the additional device; and sending the one or more commands to the additional device to cause the additional device to operate according to the one or more operational parameters.

2. The method of claim 1, wherein selected machine learning models are trained using datasets associated with one or more additional devices in one or more resource extraction sites.

3. The method of claim 1, wherein the plurality of datasets comprises pressure data, temperature data, speed data, frequency data, operational data, position data, or any combination thereof.

4. The method of claim 1, wherein each machine learning model is trained to identify at least one relationship between at least one of the plurality of datasets and at least one of the one or more operational parameters for the additional device, wherein the at least one relationship corresponds to increased production in the resource extraction site.

5. The method of claim 1, wherein the one or more commands are configured to cause the one or more devices to actuate.

6. The method of claim 1, wherein the plurality of datasets is received via a communication protocol and the one or more commands is sent via the communication protocol.

7. A system, comprising:

one or more devices in a resource extraction site, wherein the one or more devices is configured to acquire a plurality of datasets associated with the resource extraction site, the plurality of datasets including sensor data and/or operational data from the one or more devices, and the one or more devices including a valve, manifold, and/or pump of chemical injection equipment, water flooding equipment, artificial lift equipment, liquid metering equipment, power generation equipment, or a combination thereof; and a remote computing system configured to:

receive the plurality of datasets;

select a machine learning model for each context identified in the plurality of datasets, wherein each dataset is associated with one or more operations of the one or more devices based on the plurality of datasets;

determine an additional device to deploy at a recommended location in the resource extraction site and one or more operational parameters for the additional device based on a corresponding machine learning model and the plurality of datasets, the additional device including at least one selected from a group consisting of a valve, a manifold, and a pump of chemical injection equipment, water flooding equipment, artificial lift equipment, liquid metering equipment, power generation equipment, or a combination thereof;

responsive to deployment of the additional device at the recommended location, generate one or more commands for implementing the one or more operational parameters for the additional device; and send the one or more commands to the additional device to cause the additional device to operate according to the one or more operational parameters.

8. The system of claim 7, wherein the plurality of datasets comprises pressure data, temperature data, speed data, frequency data, operational data, position data, or any combination thereof.

9. The system of claim 7, wherein selected machine learning models are configured to identify at least one relationship between at least one of the plurality of datasets and at least one of the one or more operational parameters for the additional device, wherein the at least one relationship corresponds to increased production in the resource extraction site.

10. The system of claim 7, wherein the one or more devices are configured to inject one or more chemicals into one or more oil production wells.

11. The system of claim 7, wherein the one or more devices are configured to inject water into one or more water injector or one or more water disposal wells.

12. The system of claim 7, wherein the plurality of datasets is received via a communication protocol and the one or more commands are sent via the communication protocol.

13. A non-transitory computer-readable medium comprising computer-executable instructions that, when executed, are configured to cause a processing system to perform operations comprising:

receiving a plurality of datasets from one or more devices in a resource extraction site, the plurality of datasets including sensor data and/or operational data from the one or more devices, and the one or more devices including a valve, manifold, and/or pump of chemical injection equipment, water flooding equipment, artificial lift equipment, liquid metering equipment, power generation equipment, or a combination thereof;

selecting a machine learning model for each data context identified in respective datasets of the plurality of datasets, wherein each machine learning model is associated with one or more operations of the one or more devices, wherein each machine learning model is trained using datasets associated with one or more additional devices in one or more resource extraction sites, and wherein multiple machine learning models are selected for respective portions of at least one dataset to model characteristics between the respective portions and operational characteristics of the one or more devices;

determining an additional device to deploy at a recommended location in the resource extraction site and one or more operational parameters for the additional device based on a selected machine learning model and the plurality of datasets, the additional device including at least one selected from a group consisting of a valve, a manifold, and a pump of chemical injection equipment, water flooding equipment, artificial lift equipment, liquid metering equipment, power generation equipment, or a combination thereof;

responsive to deployment of the additional device, generating one or more commands for implementing the one or more operational parameters for the additional device; and sending the one or more commands to the additional device to cause the additional device to operate according to the one or more operational parameters.

14. The non-transitory computer-readable medium of claim 13, wherein the plurality of datasets comprises pressure data, temperature data, speed data, frequency data, operational data, position data, or any combination thereof.

15. The non-transitory computer-readable medium of claim 13, wherein each machine learning model is configured to identify at least one relationship between at least one of the plurality of datasets and at least one of the one or more operational parameters for the additional device, wherein the at least one relationship corresponds to increased production in the resource extraction site.

16. The non-transitory computer-readable medium of claim 13, wherein the plurality of datasets is received via a communication protocol and the one or more commands are sent via the communication protocol.

17. The non-transitory computer-readable medium of claim 13, wherein each data context is associated with at least one of flow rate, production, or emissions.

* * * * *